United States Patent
Schulz et al.

(10) Patent No.: US 11,066,292 B2
(45) Date of Patent: Jul. 20, 2021

(54) DEVICE FOR TRANSFERRING A FLUID TO A SHIP

(71) Applicant: NEXANS, Courbevoie (FR)

(72) Inventors: Holger Schulz, Hannover (DE); Christian Reiter, Sarstedt (DE); Ralf Egerer, Seesen (DE)

(73) Assignee: NEXANS, Courbevoie (FR)

( * ) Notice: Subject to any disclaimer, the term of this patent is extended or adjusted under 35 U.S.C. 154(b) by 150 days.

(21) Appl. No.: 16/493,153

(22) PCT Filed: Mar. 14, 2017

(86) PCT No.: PCT/IB2017/000392
§ 371 (c)(1),
(2) Date: Sep. 11, 2019

(87) PCT Pub. No.: WO2018/167527
PCT Pub. Date: Sep. 20, 2018

(65) Prior Publication Data
US 2020/0071155 A1    Mar. 5, 2020

(51) Int. Cl.
*B67D 9/02* (2010.01)
*F16L 59/065* (2006.01)

(52) U.S. Cl.
CPC .............. *B67D 9/02* (2013.01); *F16L 59/065* (2013.01)

(58) Field of Classification Search
None
See application file for complete search history.

(56) References Cited

U.S. PATENT DOCUMENTS 2,922,446 A    1/1960   Sheiry

FOREIGN PATENT DOCUMENTS

WO    2017/010095    1/2017

OTHER PUBLICATIONS

International Search Report dated Nov. 27, 2017.

*Primary Examiner* — Alexander S Thomas
(74) *Attorney, Agent, or Firm* — Sofer & Haroun, LLP

(57) ABSTRACT

A device (1) for transferring a fluid from a mooring area to a ship is specified. The device (1) comprises an articulated supporting structure (2), which has at least one first and one second support (3, 4, 5), which are connected pivotably to one another by at least one pivot joint (6, 7) and which each have a longitudinal axis, wherein the first support (3) is fixed on the mooring area in such a way that the longitudinal axis of said support can be rotated substantially vertically and the first support (3) can be rotated about the longitudinal axis thereof, and wherein the second support (4, 5) is pivotable in a vertical plane. The device (1) furthermore comprises at least one guide element (8), which is fixed on the supports (3, 4, 5) or on the at least one pivot joint (6, 7), and a first flexible line (9), which is supported by means of the guide element (8) and is guided substantially in the vertical plane. The device furthermore comprises a second flexible line (10), which is arranged substantially in a horizontal plane around the first support (3) and is connected to the first flexible line (9) by means of a rigid tube section (13) connected in a fixed manner to the first support (3).

6 Claims, 1 Drawing Sheet

DEVICE FOR TRANSFERRING A FLUID TO A SHIP

RELATED APPLICATION

This application is a National Phase of PCT/IB2017/000392 filed on Mar. 14, 2017, the entirety of which is incorporated by reference.

FIELD OF THE INVENTION

The invention relates to a device for transferring a fluid to a tanker, said device comprising an articulated supporting structure having at least one first and one second support, which supports and guides a flexible line by means of a guide element, with the result that the flexible line moves in a vertical plane and can be connected to lines or tanks on the ship. The first support is fixed on the mooring area in such a way that it can be rotated about its substantially vertical longitudinal axis.

DESCRIPTION OF THE RELATED ART

Fluids, e.g. cryogenic or combustible fluids such as liquefied natural gas or liquid hydrogen, are transferred to a ship via a transfer arm or a crane situated on the mooring quay. Here, transfer means both refuelling and loading ships (also referred to as bunker ships). The transfer arm comprises or carries at least one line, which can be connected to lines on the ship. For example, the transfer arm can carry a plurality of rigid lines, which are connected to one another by means of pivot joints. Here, the rigid lines can also themselves be part of the load-bearing structure of the transfer arm. The line can also be flexible and can be guided by the transfer arm, e.g. by means of a winch.

In the case of a transfer device with a flexible line or a hose, the minimum bending radius of the line must not be undershot so that said line is not damaged, e.g. by buckling. Particularly in the case of double-walled lines for conveying cryogenic liquids, the minimum bending radius is relatively large in comparison with single-walled lines of the same nominal diameter.

US 2014/0318666 A1 describes a transfer arm, which is fixed on the quay by means of a support. The transfer arm comprises a plurality of arm sections, which are connected to one another by pivot joints. The arm sections have a plurality of guide elements, by means of which a flexible line is guided. The guide elements ensure the free movement of the line without the latter undershooting a required minimum bending radius in the process. The line can be moved by the transfer arm substantially in a vertical plane to enable it to be connected to a line on the ship.

However, the known device has the disadvantage that the transfer arm cannot perform any significant lateral movements. The device can absorb only a certain amount of ship movement. In the case of lateral pivoting of the transfer arm, a torsional moment is introduced into the flexible line, potentially leading to damage and, in the case of repetitive dynamic uses, to a reduction of the service life of the flexible line. The lateral reach of the device for loading or refuelling ships is therefore significantly restricted.

OBJECTS AND SUMMARY

It is the underlying object of the invention to configure the above-described device with a flexible line in such a way that the said restrictions are removed.

According to the invention, this object is achieved by virtue of the fact that the device described at the outset comprises a second flexible line in addition to the first flexible line, which second line is arranged substantially in a horizontal plane around the first support and is connected to the first flexible line by means of a rigid tube section connected in a fixed manner to the first support.

Thanks to the device according to the invention, it is possible to orient the first flexible line at all times in the direction of the transfer arm formed by the supports. If the transfer arm is to be pivoted in a lateral direction in order, for example, to follow ship movements, the first support is turned about the longitudinal axis thereof, wherein the second flexible line is moved substantially in the horizontal plane. The first flexible line is moved along with the transfer arm without being twisted or bent. During this process, torsional moments do not act on any of the flexible lines. There is thus no risk, especially in the case of dynamic uses, of damaging flexible lines or compromising the service life thereof. The device according to the invention thus ensures a relatively large lateral reach and reliable loading or refuelling of ships with cryogenic or combustible fluids.

According to a particularly preferred embodiment of the device, the flexible lines and the rigid tube section have double walls and are vacuum-insulated. For example, there are spacers and a reflective foil between the two walls. Cryogenic lines, in particular, can be used to advantage for the energy-saving and safe transfer of very cold fluids since no external heat reaches the fluids and icing on the surface of the tubes is prevented.

BRIEF DESCRIPTION OF THE DRAWINGS

Illustrative embodiments of the subject matter of the invention are illustrated in the drawings. In the drawings.

DETAILED DESCRIPTION

Figure 1:
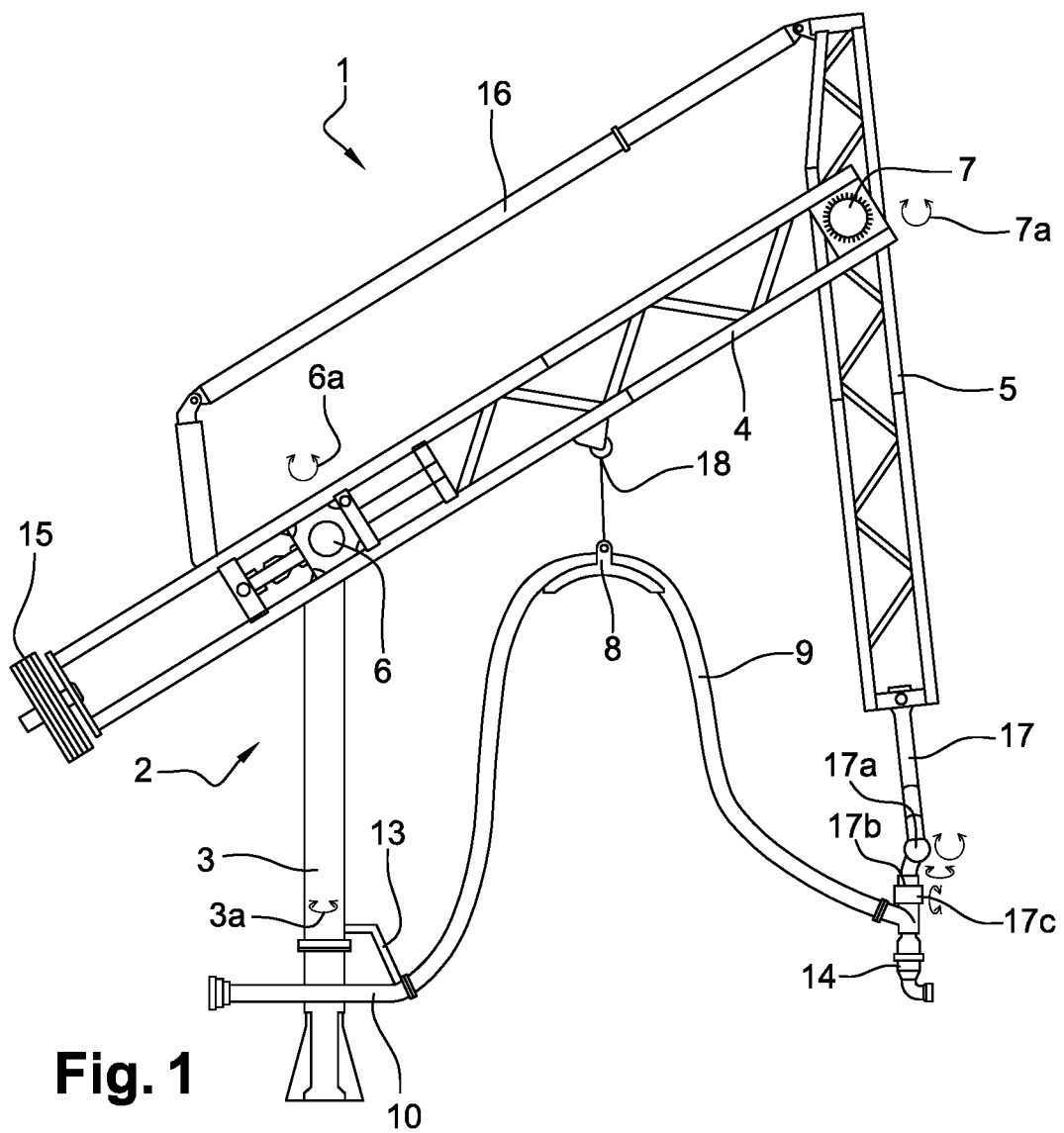
FIG. 1 shows a schematic illustration of one embodiment of the device according to the invention.

In the drawings, identical reference signs refer to identical technical features.

The device 1 according to the invention is situated either on a mooring quay on land or on a bunker ship, which supplies other ships with cargo or fuel. The term mooring area is used below to represent these possibilities.

In the illustrative embodiment shown in FIG. 1, the device 1 according to the invention comprises an articulated transfer arm 2, which is fixed on the base of the mooring area or on a carrier plate (not illustrated). The transfer arm 2 comprises three elongate, beam- or strut-type supports 3, 4, 5, which are connected rotatably to one another by pivot joints 6, 7. The first support is a foundation pillar 3, which is anchored firmly on the ground or the base of the mooring area. At least the upper section of the foundation pillar 3 is rotatable about the longitudinal axis thereof, as indicated by the arrow 3a. By virtue of the pivot joints 6, 7, the second and the third support 4, 5 can move in the common vertical plane of the longitudinal axes thereof, as indicated by the arrows 6a, 7a. The second support 4 and the third support 5 are also referred to as the inner arm and the outer arm. A counterweight 15 is mounted on the pillar end of the inner arm, support 4, compensating for the differences in leverage on the two sides of the pivot joint 6 of the inner arm 4 and of the outer arm 5 connected thereto. An articulated retention rod 16, also referred to as a pantograph, connects the third support or outer arm 5 to that part of the inner arm 4 which is on the same side as the counterweight.

The transfer arm 2 forms a supporting structure for a first flexible line 9, through which a liquid or a gas for loading or refuelling a ship flows. The first flexible line 9 is connected via a coupling (not illustrated) at its shipboard end (on the right in FIG. 1) to lines or tanks (not illustrated) on the ship to be loaded/refuelled. A safety decoupler 14 is additionally arranged between the end of the first flexible line 9 and the coupling. The safety decoupler 14 is fixed by means of a connecting rod 17 on the shipboard end of the third support 5. The connecting rod 17 has three pivot joints 17a, 17b, 17c, which can be rotated around three orthogonal axes (see arrows in FIG. 1). This enables the coupling to be moved into the correct alignment relative to the ship to be loaded/refuelled. The safety decoupler 14 ensures that the flexible line 9 is not damaged or torn off when the ship moves too far out of the work zone, for example. The line 9 is then separated in such a way that the end of the line remains closed and therefore no liquid or gas can escape.

A guide element 8, on which the first flexible line 9 rests, is furthermore attached to the transfer arm 2. The line 9 is attached firmly to the guide element 8. According to one variant, the guide element 8 can also have a surface such that the friction between the guide element 8 and the flexible line 9 is low, thus enabling the line 9 to slide relative to the guide element 8. The radius of the guide element 8 is equal to or greater than the minimum bending radius of the flexible line 9. The guide element is secured on the second support 4 by means of a winch 18, for example. If the third support 5 swings out on the shipboard side, the guide element 8 is lowered by means of the winch 18, thus levelling the flexible line 9 and guiding the shipboard end thereof to the ship.

Figure 2:
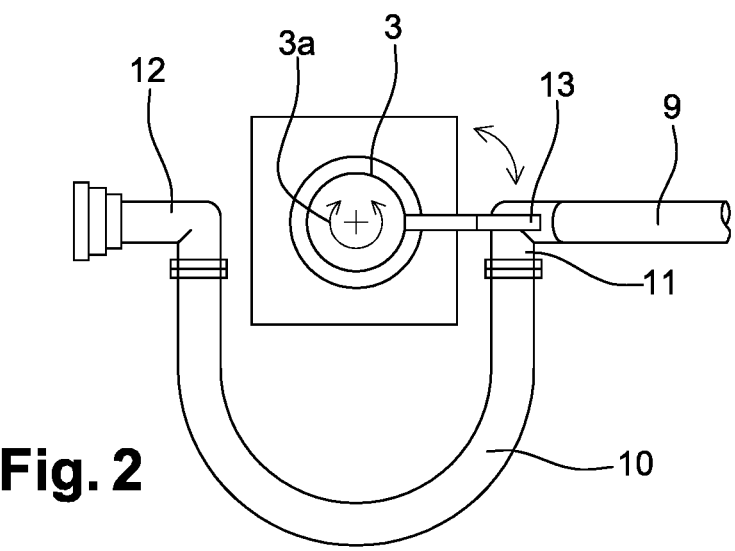
FIG. 2 shows a horizontal section through the device shown in FIG. 1.

According to the invention, a second, additional flexible line 10 is arranged around the foundation pillar 3. A horizontal section through the foundation pillar 3 with the second flexible line 10 is shown in FIG. 2. The second flexible line 10 is arranged approximately in a U-shaped arc substantially in the horizontal plane, i.e. substantially parallel to the base of the site of the device 1. The planes in which the two flexible lines 9, 10 are situated are accordingly substantially perpendicular to one another. The second flexible line 10 is connected to the first flexible line 9 by means of a first rigid pipe elbow 11. At its other end, the second flexible line 10 is likewise connected by means of a second rigid pipe elbow 12 to a supply line, a tank or the like (not illustrated). The first rigid pipe elbow 11 is connected in a mechanically fixed manner to the foundation pillar 3 of the transfer arm 2 by a connecting member 13. The second flexible line 10 can rest, for example, on a supporting element (not illustrated), on which it can move freely.

In order to move the first flexible line 9 into a particular lateral position, the device 1 is rotated about the longitudinal axis of the foundation pillar 3 (arrow 3a). The angle of rotation of the foundation pillar can be up to 45°, for example. As a result of the rotation, the first rigid pipe elbow 11 moves around the longitudinal axis of the foundation pillar 3 at the same time. The first flexible line 9 thus adopts an orientation which corresponds to the second and third supports 4, 5. During this process, the first flexible line 9 is not subject to any torsional moment. The second rigid pipe elbow 12 remains in its position. The second flexible line 10 follows the rotation of the pillar 3. There is likewise no torsional moment acting on the second flexible line 10 since it is not twisted in a radial direction. Only its position in the horizontal plane is changed.

The flexible lines 9, 10 and the pipe sections 11, 12 can each be of double-walled and vacuum-insulated design. The connections between the rigid and flexible lines and pipes can then be embodied by known Johnston couplings, for example. The joints can also be welded, giving a continuous vacuum chamber between the inner and outer walls of the lines. The flexible lines 9, 10 are corrugated metal tubes, for example. They each consist of at least two nested flexible metal tubes, for example. The interspace between the individual metal tubes can be filled with foam for thermal insulation. For vacuum insulation, the interspace can be evacuated and provided with reflective foil and spacers between the two tubes. Respective further cables or lines, e.g. for data and/or power transmission, can be attached to the flexible lines.

Instead of the single first and second flexible lines 9, 10 illustrated, it is also possible in each case to use two or more flexible lines, which are then each connected to a corresponding number of rigid pipe sections and couplings.

The device 1 according to the invention can be secured directly on the base of the mooring area. The device 1 can be anchored firmly in place or can be movable laterally on rails, for example.

The invention claimed is:

1. Device for transferring a fluid from a mooring area to a ship, comprising:
    an articulated supporting structure, which has at least one first and one second support, which are connected pivotably to one another by at least one pivot joint and which each have a longitudinal axis, wherein the first support is fixed on the mooring area in such a way that the longitudinal axis of said support can be rotated substantially vertically and the first support can be rotated about the longitudinal axis thereof, and wherein the second support is pivotable in a vertical plane,
    at least one guide element, which is fixed on the supports or on the at least one pivot joint, and
    a first flexible line, which is supported by means of the guide element and is guided substantially in the vertical plane,
        wherein the device furthermore comprises a second flexible line, which is arranged substantially in a horizontal plane around the first support and is connected to the first flexible line by means of a rigid tube section connected in a fixed manner to the first support.

2. Device according to claim 1, wherein the device can be moved in a predetermined direction on rails.

3. Device according to claim 1, wherein the flexible lines and the rigid tube section have double walls and are vacuum-insulated.

4. Device according to claim 3, wherein the flexible lines are each connected to the rigid tube section by means of Johnston couplings.

5. Device according to claim 1, wherein the flexible lines are each welded to the rigid tube section.

6. Device according to claim 1, wherein at least one cable for the transmission of power and/or data is attached to the flexible lines.

* * * * *